(12) United States Patent
Kim (10) Patent No.: US 11,405,080 B2
(45) Date of Patent: Aug. 2, 2022

(54) BASE STATION FOR COMMUNICATING USING PLURALITY OF ANTENNAS AND OPERATION METHOD THEREFOR

(71) Applicant: Samsung Electronics Co., Ltd., Suwon-si (KR)

(72) Inventor: Jinsung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/978,751

(22) PCT Filed: Mar. 7, 2019

(86) PCT No.: PCT/KR2019/002645
§ 371 (c)(1),
(2) Date: Sep. 7, 2020

(87) PCT Pub. No.: WO2019/172672
PCT Pub. Date: Sep. 12, 2019

(65) Prior Publication Data
US 2020/0412423 A1    Dec. 31, 2020

(30) Foreign Application Priority Data
Mar. 7, 2018 (KR) .................. 10-2018-0027113

(51) Int. Cl.
*H04B 7/06* (2006.01)
*H04L 25/03* (2006.01)
*H04L 25/49* (2006.01)

(52) U.S. Cl.
CPC ......... *H04B 7/0608* (2013.01); *H04B 7/0617* (2013.01); *H04L 25/03853* (2013.01); *H04L 25/4921* (2013.01)

(58) Field of Classification Search
CPC ............... H04B 7/0608; H04B 7/0617; H04L 25/03853; H04L 25/4921; H04L 25/03343; H04L 25/49; H04L 25/03949
(Continued)

(56) References Cited

U.S. PATENT DOCUMENTS 8,401,482 B2  3/2013  Muterspaugh
8,933,836 B1  1/2015  Woodell et al.
(Continued)

FOREIGN PATENT DOCUMENTS

KR  10-2005-0107715 A  11/2005
KR  10-2009-0005427 A  1/2009
(Continued)

OTHER PUBLICATIONS

Delaunay et al. "A RF Transmitter Linearized Using Cartesian Feedback in CMOS 65nm for UMTS Standard", 2011 IEEE Topical Conference on Power Amplifiers for Wireless and Radio Applications, Jan. 16-19, 2011, 4 pages.
(Continued)

*Primary Examiner* — Fitwi Y Hailegiorgis (57) ABSTRACT

According to an embodiment of the disclosure, a base station communicating by using a plurality of antennas includes: a memory; a transceiver including the plurality of antennas forming an array structure; and at least one processor configured to convert first in-phase quadrature (IQ) data included in a first digital signal into radio frequency (RF) signals and then apply the RF signals to the plurality of antennas, respectively, detect a back-lobe signal beamformed by the plurality of antennas, and perform linearization on second IQ data included in a second digital signal, based on the detected back-lobe signal.

15 Claims, 9 Drawing Sheets

(58) Field of Classification Search
USPC ........................................................ 375/262
See application file for complete search history.

(56) References Cited

U.S. PATENT DOCUMENTS

| | | | |
|---|---|---|---|
| 2015/0188585 A1* | 7/2015 | Laurent-Michel | H01Q 19/13 |
| | | | 375/349 |
| 2016/0191176 A1 | 6/2016 | O'Keeffe et al. | |
| 2017/0303142 A1 | 10/2017 | Schmid et al. | |

FOREIGN PATENT DOCUMENTS

| | | |
|---|---|---|
| KR | 10-1413781 B1 | 6/2014 |
| KR | 10-2015-0060308 A | 6/2015 |
| WO | 2018/007303 A1 | 1/2018 |

OTHER PUBLICATIONS

International Search Report dated Jul. 2, 2019 in connection with International Patent Application No. PCT/KR2019/002645, 2 pages.
Written Opinion of the International Searching Authority dated Jul. 2, 2019 in connection with International Patent Application No. PCT/KR2019/002645, 8 pages.
Korean Intellectual Property Office, "Notice of Non-Final Rejection" dated Feb. 25, 2022, in connection with Korean Office Action No. 10-2018-0027113, 11 pages.

\* cited by examiner

FIG. 9

BASE STATION FOR COMMUNICATING USING PLURALITY OF ANTENNAS AND OPERATION METHOD THEREFOR

CROSS-REFERENCE TO RELATED APPLICATIONS

This application is a 371 of International Application No. PCT/KR2019/002645 filed on Mar. 7, 2019, which claims priority to Korean Patent Application No. 10-2018-0027113 filed on Mar. 7, 2018, the disclosures of which are herein incorporated by reference in their entirety.

BACKGROUND

1. Field

The disclosure relates to a base station for communicating by using a plurality of antennas, and an operating method thereof, and more particularly, to a base station for performing linearization based on a signal beam-formed by a plurality of antennas, and an operating method thereof.

2. Description of Related Art

A base station of a mobile communication system including Code-Division Multiple Access (CDMA), Wideband Code Division Multiple Access (WCDMA), Long-Term Evolution (LTE), or the like may consist of a digital unit to process a digital signal, a radio frequency (RF) unit to process a RF signal, and an antenna to radiate a RF signal amplified by the RF unit. The RF unit converts a digital output signal from the digital unit into a RF signal, amplifies and then transfers the RF signal to the antenna, and generally includes 2, 4, 6, or 8 transmission paths (Tx paths) according to a system structure. The RF signal of the RF unit is amplified while passing through a power amplifier, and due to a nonlinear characteristic of the power amplifier, an inter modulation (IM) signal occurs around the RF signal. The IM signal interferes with an adjacent band by increasing an Adjacent Channel Leakage Ratio (ACLR), or decreases a throughput by degrading Error Vector Magnitude (EVM), thereby degrading performance of a system.

Linearization techniques are applied to the RF unit to prevent occurrence of the nonlinear characteristic therein, and one of the linearization techniques is a Digital Pre-Distortion (DPD) technique. The DPD technique refers to a technique for pre-compensating for nonlinearity in a state of a digital signal, the nonlinearity occurring in a RF signal processing procedure. An output signal of the power amplifier is demodulated by being fed back by using a coupler located at the rear of the power amplifier, and then is compared with a phase and magnitude of an in-phase quadrature (IQ) input signal from the digital unit, such that the nonlinear characteristic of the power amplifier is modelled. Afterward, a waveform obtained by distorting the input IQ signal in a manner inverse to the nonlinear characteristic of the power amplifier is input to the power amplifier, such that the nonlinearity may be canceled.

However, in a case where the RF unit and the antenna are separate, and the RF signal has to be transferred to a plurality of antennas via a plurality of transmit paths, a scheme of feeding back the output signal of the power amplifier by using the coupler located at the rear of the power amplifier may be inefficient. It is difficult to implement lines for feeding back the output signal of the power amplifier with respect to each of the Tx paths, and Signal-to-Noise Ratio (SNR) degradation due to mutual interference between feedback signals of the Tx paths may occur, and in order to prevent the SNR degradation, system complexity has to be increased.

Various embodiments may provide a base station for performing linearization based on a signal beam-formed by a plurality of antennas, and an operating method thereof.

SUMMARY

According to an embodiment of the disclosure, a base station communicating by using a plurality of antennas includes: a memory; a transceiver including the plurality of antennas forming an array structure; and at least one processor configured to convert first in-phase quadrature (IQ) data included in a first digital signal into radio frequency (RF) signals and then apply the RF signals to the plurality of antennas, respectively, detect a back-lobe signal beam-formed by the plurality of antennas, and perform linearization on second IQ data included in a second digital signal, based on the detected back-lobe signal.

DETAILED DESCRIPTION

According to an embodiment, a base station communicating by using a plurality of antennas includes: a memory; a transceiver including an array structure of the plurality of antennas; and at least one processor configured to convert first in-phase quadrature (IQ) data included in a first digital signal into radio frequency (RF) signals and then apply the RF signals to the plurality of antennas, respectively, detect a back-lobe signal beam-formed by the plurality of antennas, and perform linearization on second IQ data included in a second digital signal, based on the detected back-lobe signal.

In the base station communicating by using the plurality of antennas according to an embodiment, the at least one processor may be further configured to shift phases of the RF signals before applying the RF signals to the plurality of antennas, respectively.

In the base station communicating by using the plurality of antennas according to an embodiment, the at least one processor may be further configured to perform beamforming based on a phase difference between the RF signals respectively applied to the plurality of antennas.

In the base station communicating by using the plurality of antennas according to an embodiment, the at least one processor may detect, by using at least one detector, the back-lobe signal beam-formed by the plurality of antennas.

In the base station communicating by using the plurality of antennas according to an embodiment, the at least one detector may be located on a movement path from among a plurality of movement paths of the back-lobe signal beam-formed by the plurality of antennas.

In the base station communicating by using the plurality of antennas according to an embodiment, the base station may include at least one ground conductor (GND) located within a predetermined range from the at least one detector, and a strength of the back-lobe signal detected by the at least one detector may be determined according to the number of GNDs located on a movement path of one of the at least one GND.

In the base station communicating by using the plurality of antennas according to an embodiment, the at least one detector may be included in a multi-layer printed circuit board (PCB) located on a movement path from among a plurality of movement paths of the back-lobe signal beam-formed by the plurality of antennas.

In the base station communicating by using the plurality of antennas according to an embodiment, a structure of the at least one detector may be determined based on at least one of a thickness of the multi-layer PCB, a dielectric constant of the multi-layer PCB, and a stack-up structure of the multi-layer PCB.

In the base station communicating by using the plurality of antennas according to an embodiment, the at least one processor may include at least one GND located within a predetermined range from the plurality of antennas.

In the base station communicating by using the plurality of antennas according to an embodiment, a strength of the back-lobe signal detected by the at least one detector may be determined according to at least one a distance d between the plurality of antennas and the at least one detector and a width of the at least one detector.

In the base station communicating by using the plurality of antennas according to an embodiment, the at least one processor may be further configured to perform linearization on the second IQ data by applying a Digital Pre-Distortion (DPD) technique to the second IQ data by using the detected back-lobe signal.

In the base station communicating by using the plurality of antennas according to an embodiment, the at least one processor may be further configured to obtain power corresponding to the detected back-lobe signal, and adjust power of the second digital signal, based on the obtained power.

In the base station communicating by using the plurality of antennas according to an embodiment, the at least one processor may further include: a transmission controller configured to convert the first IQ data into the RF signals and then apply the RF signals to the plurality of antennas, respectively, and perform linearization on the second IQ data; and a feedback module configured to transfer the detected back-lobe signal to the transmission controller.

According to an embodiment, a method, performed by a base station, of communicating by using a plurality of antennas includes: converting first in-phase quadrature (IQ) data included in a first digital signal into radio frequency (RF) signals and then applying the respective RF signals to the plurality of antennas forming an array structure; detecting a back-lobe signal beam-formed by the plurality of antennas; and performing linearization on second IQ data included in a second digital signal, based on the detected back-lobe signal.

According to an embodiment, provided is a computer-readable recording medium having recorded thereon a program for executing a method, performed by a base station, of communicating by using a plurality of antennas, the method including: converting first in-phase quadrature (IQ) data included in a first digital signal into radio frequency (RF) signals and then applying the respective RF signals to the plurality of antennas forming an array structure; detecting a back-lobe signal beam-formed by the plurality of antennas; and performing linearization on second IQ data included in a second digital signal, based on the detected back-lobe signal.

In a wireless communication system such as Long Term Evolution (LTE), $5^{th}$ generation (5G), or the like, and a communication system thereafter, there is a demand for communication via a plurality of antennas so as to obtain a condition effective for providing a higher spatial degree of freedom and multiplexing a plurality of data streams. A communication scheme between a user terminal (UE) and a base station that is configured with an array antenna system including an array structure of a plurality of antennas is being increased.

The disclosure will now be described more fully with reference to the accompanying drawings for one of ordinary skill in the art to be able to perform the disclosure without any difficulty. The disclosure may, however, be embodied in many different forms and should not be construed as being limited to the embodiments set forth herein. In addition, portions irrelevant to the description of the disclosure will be omitted in the drawings for a clear description of the disclosure, and like reference numerals will denote like elements throughout the specification.

Terms used in the specification may be used to describe various components, but such components must not be limited to the terms. The terms are used only to distinguish one component from another.

Drawings may be schematically illustrated for descriptions of an embodiment of the disclosure, and some dimensions may be exaggerated for clarity. Similarly, the drawings may be arbitrarily represented.

Terms such as "unit," "module," or the like used in the disclosure have to be construed to include software, hardware, or a combination of hardware and software, according to context where the terms are used. For example, software may refer to machine language, firmware, embedded code, and application software. As another example, hardware may refer to a circuit, a processor, a computer, an integrated circuit, an integrated circuit core, Micro-Electro-Mechanical Systems (MEMS), a manual device, or a combination thereof.

Embodiments and the accompanying drawings provided in the disclosure are only to describe the disclosure by using some embodiments among various embodiments of the disclosure, and thus the disclosure is not limited to the embodiments and the accompanying drawings.

Hereinafter, the disclosure will now be described in detail with reference to the drawings.

Figure 1:
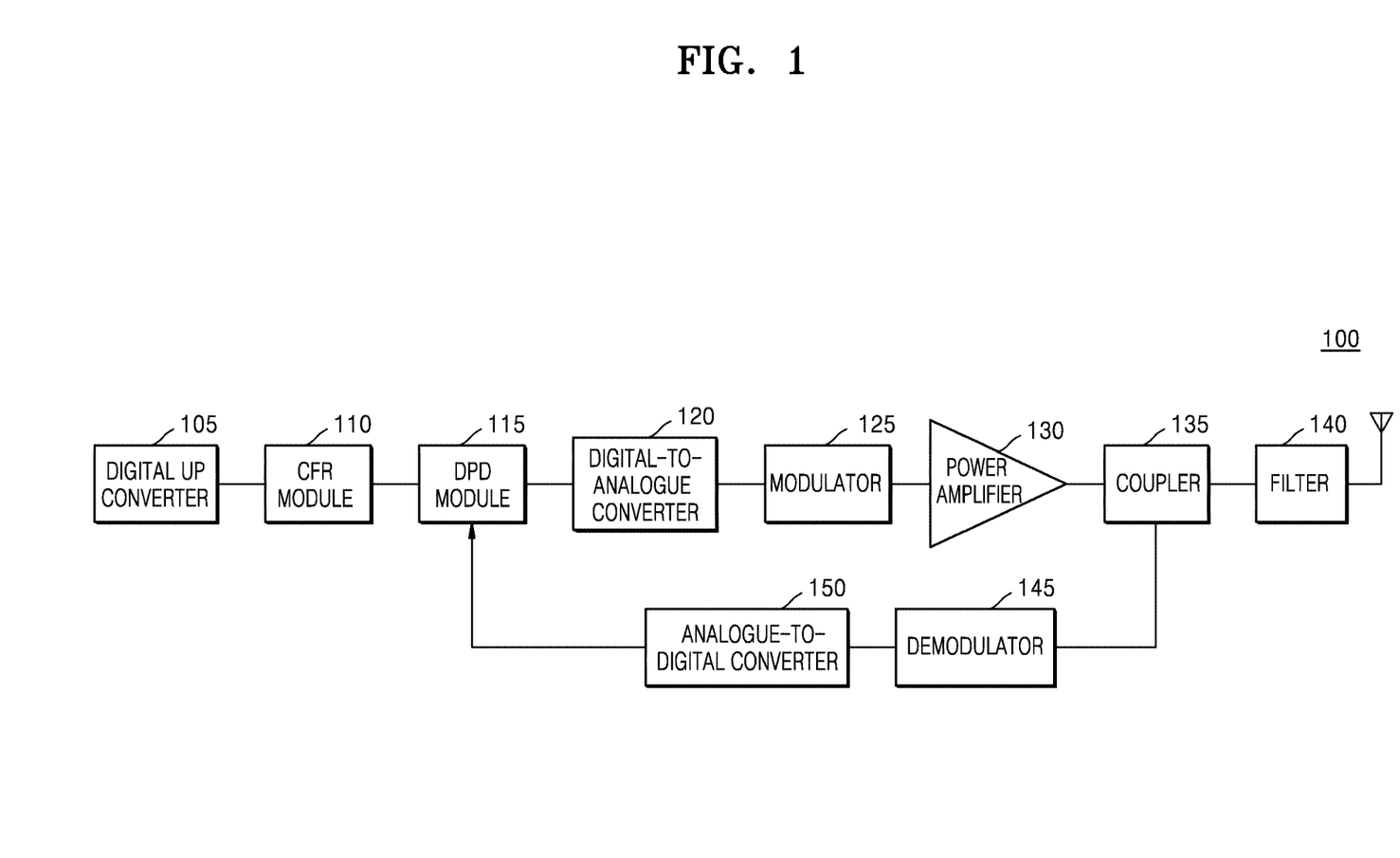
FIG. 1 is a block diagram of a radio frequency (RF) unit of a base station, which is arranged to prevent occurrence of nonlinearity

FIG. 1 is a block diagram of a radio frequency (RF) unit of a base station, which is arranged to prevent occurrence of nonlinearity.

As illustrated in FIG. 1, a RF unit 100 may include a digital up converter 105, a Crest Factor Reduction (CFR) module 110, a Digital Pre-Distortion (DPD) module 115, a digital-to-analogue converter (DAC) 120, a modulator 125, a power amplifier 130, a coupler 135, a filter 140, a demodulator 145, and an analogue-to-digital converter (ADC) 150.

The digital up converter 105 may increase a sample rate of a digital signal.

The CFR module 110 may decrease a peak power component without degrading a signal characteristic, the peak power component occurring when signals with multiple frequency components are merged.

The DPD module 115 may pre-compensate for nonlinearity in a state of a digital signal, the nonlinearity occurring in a RF signal processing procedure.

The digital-to-analogue converter 120 may convert a digital signal into an analogue signal.

The modulator 125 may modulate amplitude, a frequency, or a phase of signal, and the demodulator 145 may demodulate the amplitude, the frequency, or the phase of the signal modulated by the modulator 125. The modulator 125 may convert an in-phase quadrature (IQ) signal obtained from a digital unit into a RF signal, and the demodulator 145 may convert a RF signal into an IQ signal.

The power amplifier 130 may amplify power of a signal.

The coupler 135 is located at the rear of a power amplifier, and may be used to feed back an output signal from the power amplifier.

The filter 140 may remove an intermodulation (IM) signal of an out-of-band signal from the output signal from the power amplifier.

The analogue-to-digital converter 150 may convert an analogue signal into a digital signal.

The DPD module 115 may estimate the nonlinearity to occur in the RF signal processing procedure, based on an output signal from the power amplifier 130 fed back via the coupler 135, and may pre-compensate for the nonlinearity to occur in the RF signal processing procedure in a state of a digital signal.

For example, the DPD module 115 may compare the output signal from the power amplifier 130, fed back via the coupler 135, and then passing through the demodulator 145 and the analogue-to-digital converter 150 with a magnitude and a phase of an IQ signal obtained from the digital unit and then passing through the digital up converter 105 and the CFR module 110, thereby modelling a nonlinear characteristic of the power amplifier 130. The DPD module 115 may generate a waveform obtained by distorting the IQ signal, which is obtained from the digital unit and then passes through the digital up converter 105 and the CFR module 110, in a manner inverse to the nonlinear characteristic of the power amplifier 130, and may input the waveform to the power amplifier 130 via the digital-to-analogue converter 120 and the modulator 125.

Figure 2:
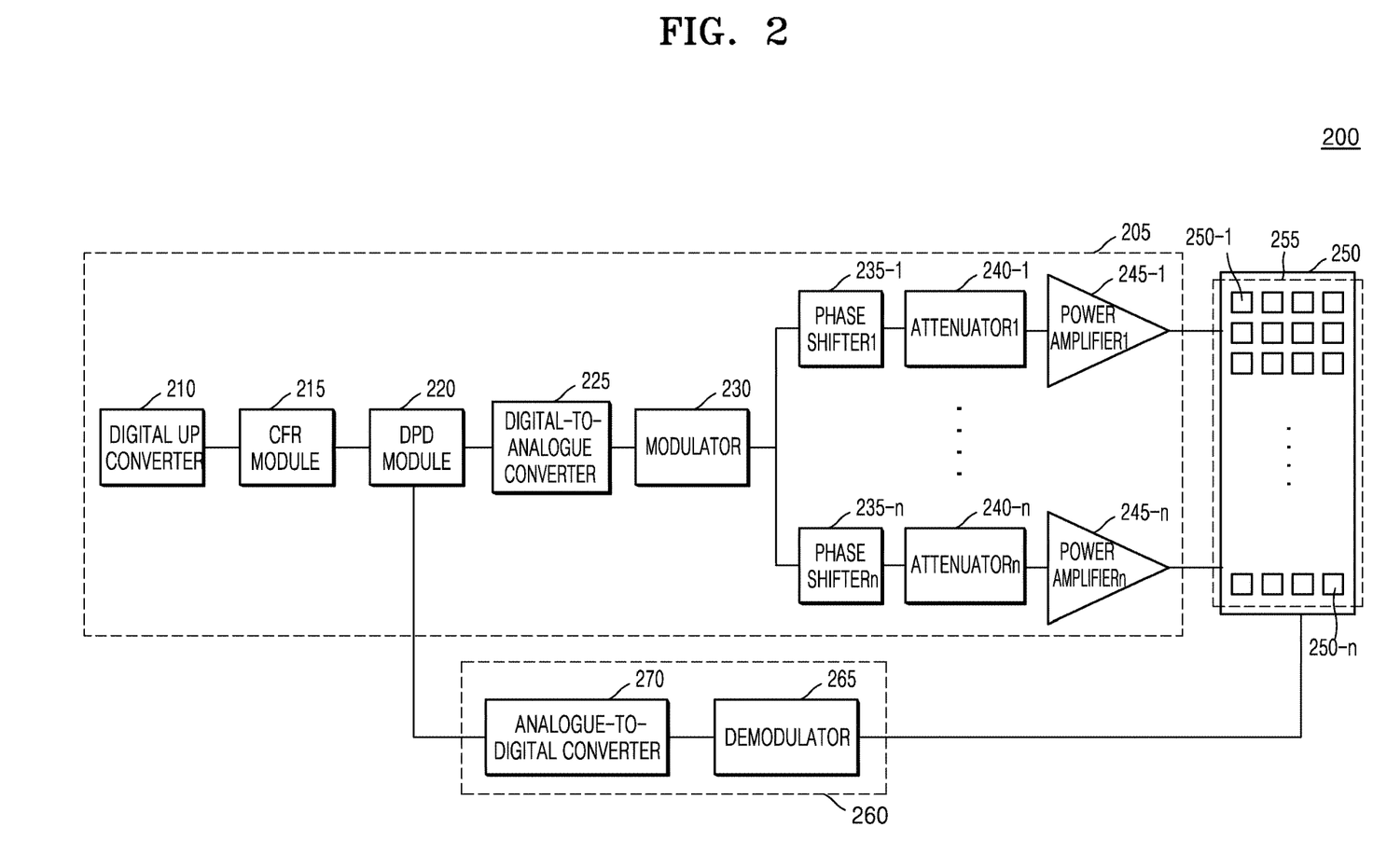
FIG. 2 is a block diagram of a base station that communicates by using a plurality of antennas, according to an embodiment.

FIG. 2 is a block diagram of a base station that communicates by using a plurality of antennas, according to an embodiment.

In FIG. 2, descriptions overlapping with those of FIG. 1 are omitted or briefly described.

A base station 200 according to an embodiment may include a RF unit 205, a plurality of antennas 250, and a feedback module 260.

The RF unit 205 may include a digital up converter 210, a CFR module 215, a DPD module 220, a digital-to-analogue converter 225, a modulator 230, n phase shifters 235-1, . . . , 235-n, n attenuators 240-1, . . . , 240-n, and n power amplifiers 245-1, . . . , 245-n. In this regard, n may correspond to the number of the plurality of antennas 250.

The phase shifter 1 235-1, the attenuator 1 240-1, and the power amplifier 1 245-1 may form one transmit path, and in this manner, the base station 200 may include n transmit paths. Although not particularly illustrated in FIG. 2, it is obvious to one of ordinary skill in the art that respective transmit paths are connectable to a plurality of antennas 250-1, . . . , 250-n.

The phase shifters 235-1, . . . , 235-n according to an embodiment may respectively shift phases of RF signals converted by the modulator 230.

The attenuators 240-1, . . . , 240-n according to an embodiment may adjust powers of signals respectively applied to the plurality of antennas 250-1, . . . , 250-n. For example, the attenuators 240-1, . . . , 240-n may adjust powers of signals to be within a mutually predetermined error range, the signals being respectively applied to the plurality of antennas 250-1, . . . , 250-n.

The plurality of antennas 250 according to an embodiment may perform beam-forming, based on a phase difference between the RF signals applied to the plurality of antennas 250, respectively.

The plurality of antennas 250 may form an array structure. For example, as illustrated in FIG. 2, n antennas 250-1, . . . , 250-n may form an array structure, and the n antennas 250-1, . . . , 250-n may be connected to the n power amplifiers 245-1, . . . , 245-n, respectively.

A broken line 255 shown in FIG. 2 indicates a back side of the plurality of antennas 250, i.e., a direction in which a back-lobe signal beam-formed by the plurality of antennas 250 is radiated.

Detailed descriptions about the back side of the plurality of antennas 250 will be provided below with reference to FIG. 6.

The feedback module 260 may include a demodulator 265 and an analogue-to-digital converter 270. When the back-lobe signal beam-formed by the plurality of antennas 250 is detected at the back side 255 of the plurality of antennas 250, the detected back-lobe signal may be transferred to the DPD module 220 via the feedback module 260.

The DPD module 220 may estimate nonlinearity to occur in a RF signal processing procedure (e.g., a processing procedure after an IQ signal passes through the modulator 230), based on the back-lobe signal of the plurality of antennas 250 which is transferred via the feedback module 260. The DPD module 220 may pre-compensate for the nonlinearity to occur in the RF signal processing procedure, in a state of a digital signal.

For example, the DPD module 220 may compare the back-lobe signal of the plurality of antennas 250, which is transferred via the feedback module 260, with a magnitude and a phase of an IQ signal obtained from a digital unit and then passing through the digital up converter 210 and the CFR module 215, thereby modelling a nonlinear characteristic of the power amplifiers 245-1, . . . , 245-n. The DPD module 220 may generate a waveform obtained by distorting the IQ signal, which is obtained from the digital unit and then passes through the digital up converter 210 and the CFR module 215, in a manner inverse to the nonlinear characteristic of the power amplifiers 245-1, . . . , 245-n, and may transfer the waveform to the power amplifiers 245-1, . . . , 245-n via the digital-to-analogue converter 225, the modulator 230, the phase shifters 235-1, . . . , 235-n, and the attenuators 240-1, . . . , 240-n.

The base station 200 according to an embodiment may detect a back-lobe signal at the back side 255 of the plurality of antennas 250 and may feed back the back-lobe signal to the DPD module 220, without detecting a signal from each of a plurality of transmit paths (n transmit paths in the example of FIG. 2) and feeding the signal back to the DPD module 220. The base station 200 may increase efficiency in a feedback procedure by feeding back a detected signal to the DPD module 220 via one path by using the feedback module 260.

Figure 3:
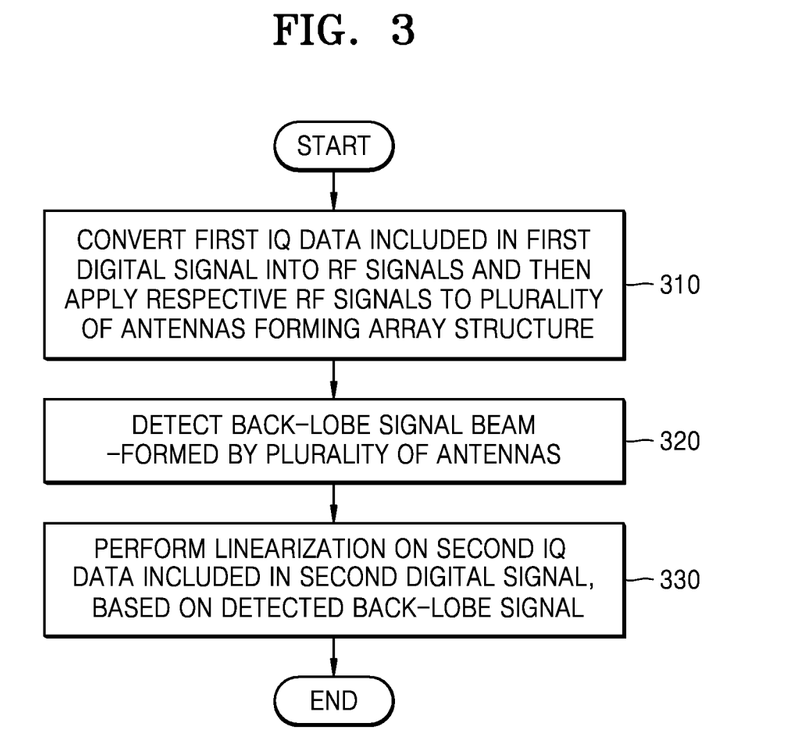
FIG. 3 is a flowchart of a method, performed by a base station, of communicating by using a plurality of antennas, according to an embodiment.

FIG. 3 is a flowchart of a method, performed by a base station, of communicating by using a plurality of antennas, according to an embodiment.

In FIG. 3, descriptions overlapping with those of FIG. 2 are omitted or briefly described.

With respect to terms "first digital signal" and "second digital signal" used in the present specification, a first digital signal refers to a signal that reaches the base station 200 earlier than a second digital signal. IQ data included in the first digital signal is referred to as "first IQ data", and IQ data included in the second digital signal is referred to as "second IQ data".

In operation 310, the base station 200 may convert the first IQ data included in the first digital signal into RF signals and then may apply the respective RF signals to a plurality of antennas forming an array structure.

In detail, the first digital signal of the base station 200 may be transferred to the modulator 230 after passing through the digital up converter 210, the CFR module 215, the DPD module 220, and the digital-to-analogue converter 225 which are included in the base station 200, and the modulator 230 may convert the first IQ data included in the first digital signal into the RF signals. The modulator 230 may apply the RF signals converted from the first IQ data to the respective antennas 250 forming the array structure, via the phase shifters 235-1, . . . , 235-n, the attenuators 240-1, . . . , 240-n, and the power amplifiers 245-1, . . . , 245-n which are included in the base station 200.

In operation 320, the base station 200 may detect a back-lobe signal beam-formed by the plurality of antennas.

In detail, the base station 200 may include the plurality of antennas 250 and a detector, and the detector may detect, at the back side 255 of the plurality of antennas 250, the back-lobe signal beam-formed by the plurality of antennas 250. The details related to the detector that detects the back-lobe signal beam-formed by the plurality of antennas 250 will be described below with reference to FIGS. 6 and 7.

In operation 330, the base station 200 may perform linearization on second IQ data included in the second digital signal, based on the detected back-lobe signal.

In more detail, the base station 200 may include the detector, the feedback module 260, and the DPD module 220, and the back-lobe signal detected by the detector may be transferred to the DPD module 220 via the feedback module 260. The DPD module 220 may estimate nonlinearity to occur in a RF signal processing procedure, based on the back-lobe signal of the plurality of antennas 250 which is transferred via the feedback module 260. The DPD module 220 may pre-compensate for the nonlinearity to occur in the RF signal processing procedure, in a state of a digital signal.

Figure 4:
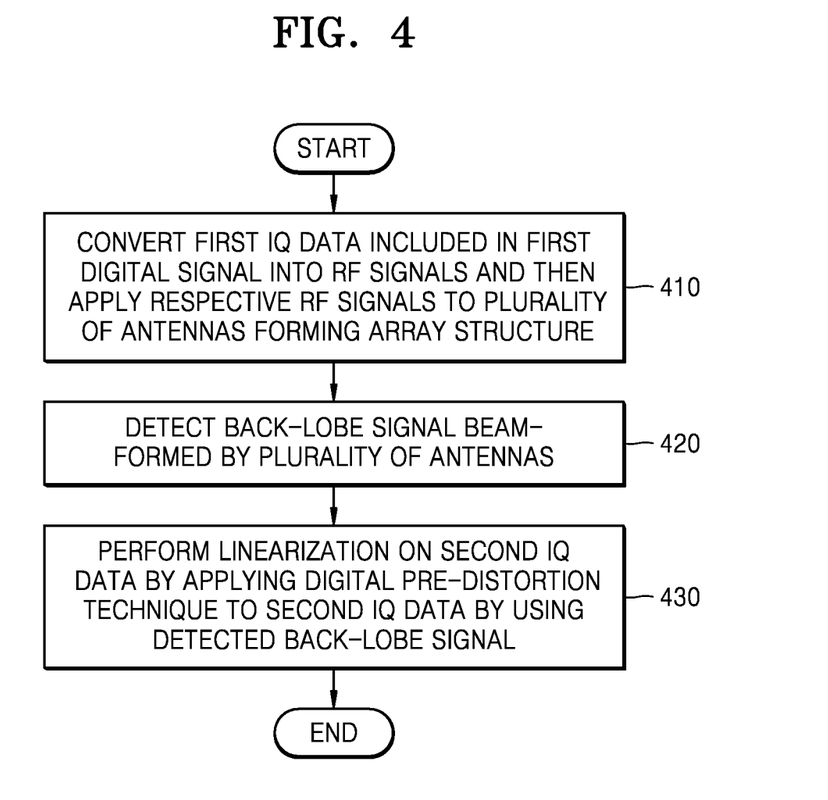
FIG. 4 is a flowchart of a method, performed by a base station, of communicating by using a plurality of antennas, according to another embodiment.

FIG. 4 is a flowchart of a method, performed by a base station, of communicating by using a plurality of antennas, according to another embodiment.

In FIG. 4, descriptions overlapping with those of FIG. 3 are omitted or briefly described. For example, operations 410 and 420 respectively correspond to operations 310 and 320 of FIG. 3, and thus detailed descriptions about operations 410 and 420 are omitted.

In operation 410, the base station 200 may convert the first IQ data included in the first digital signal into RF signals and then may apply the respective RF signals to a plurality of antennas forming an array structure.

In operation 420, the base station 200 may detect a back-lobe signal beam-formed by the plurality of antennas.

In operation 430, the base station 200 may perform linearization on second IQ data by applying a Digital Pre-Distortion (DPD) technique to the second IQ data by using the detected back-lobe signal.

In more detail, the base station 200 may include the detector, the DPD module 220, and the feedback module 260, and the back-lobe signal detected by the detector may be transferred to the DPD module 220 via the feedback module 260.

The DPD module 220 may apply the DPD technique to the second IQ data by using the detected back-lobe signal. The DPD module 220 may model a nonlinear characteristic of the power amplifiers 245-1, . . . , 245-n by comparing the back-lobe signal of the plurality of antennas 250 which is transferred via the feedback module 260 with a magnitude and a phase of the second IQ data that is obtained from a digital unit and then passes through the digital up converter 210 and the CFR module 215. The DPD module 220 may generate a waveform obtained by distorting the second IQ data, which is obtained from the digital unit and then passes through the digital up converter 210 and the CFR module 215, in a manner inverse to the nonlinear characteristic of the power amplifiers 245-1, . . . , 245-n. The DPD module 220 may transfer the waveform, which is obtained by distorting the second IQ data in a manner inverse to the nonlinear characteristic of the power amplifiers 245-1, . . . , 245-n, to the power amplifiers 245-1, . . . , 245-n via the digital-to-analogue converter 225, the modulator 230, the phase shifters 235-1, . . . , 235-n, and the attenuators 240-1, . . . , 240-n.

Figure 5:
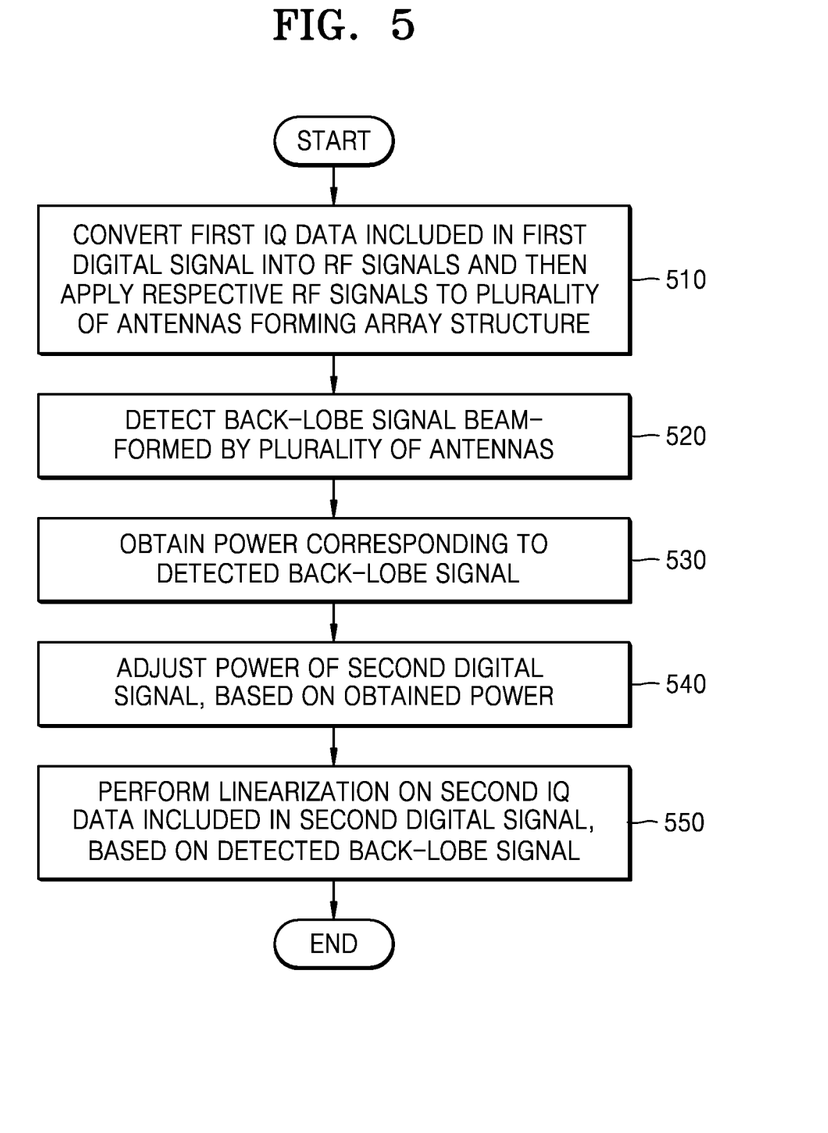
FIG. 5 is a flowchart of a method, performed by a base station, of communicating by using a plurality of antennas, according to another embodiment.

FIG. 5 is a flowchart of a method, performed by a base station, of communicating by using a plurality of antennas, according to another embodiment.

In FIG. 5, descriptions overlapping with those of FIG. 3 or 4 are omitted or briefly described. For example, operations 510, 520, and 550 respectively correspond to operations 310, 320, and 330 of FIG. 3, and thus detailed descriptions about operations 510, 520, and 550 are omitted.

In operation 510, the base station 200 may convert the first IQ data included in the first digital signal into RF signals and then may apply the respective RF signal to a plurality of antennas forming an array structure.

In operation 520, the base station 200 may detect a back-lobe signal beam-formed by the plurality of antennas.

In operation 530, the base station 200 may obtain power corresponding to the detected back-lobe signal. The base station 200 according to an embodiment may include the detector and the feedback module 260. The back-lobe signal detected by the detector may be transferred to the feedback module 260, and the feedback module 260 may demodulate and convert the detected back-lobe signal into IQ data. The base station 200 may measure power of the converted IQ data, thereby obtaining power corresponding to the back-lobe signal detected by the detector.

In operation 540, the base station 200 may adjust power of the second digital signal, based on the obtained power. In more detail, when the obtained power is lower than a threshold, the base station 200 may increase an input power level of the second digital signal, and when the obtained power is higher than the threshold, the base station 200 may decrease an input power level of the second digital signal.

In operation 550, the base station 200 may perform linearization on second IQ data included in the second digital signal, based on the detected back-lobe signal.

Figure 6:
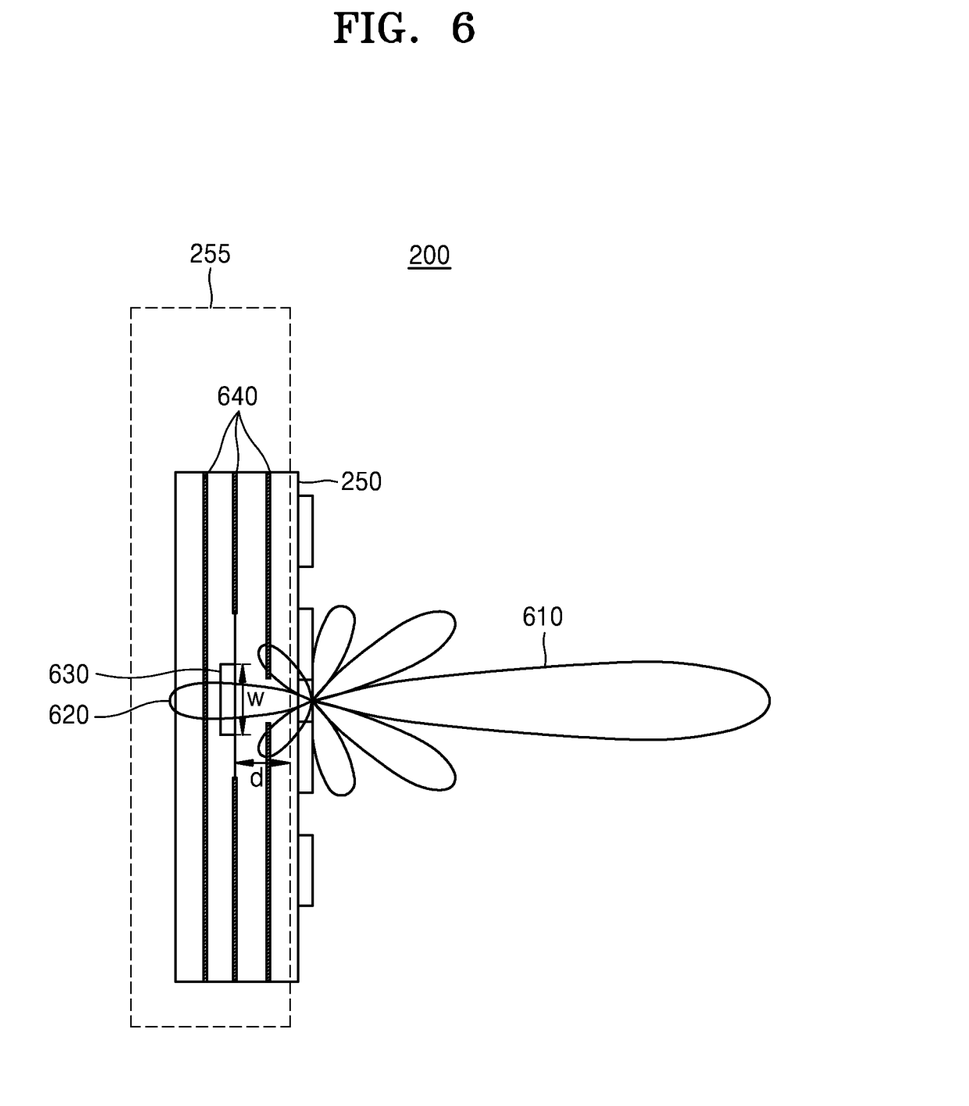
FIG. 6 illustrates a particular example in which a base station detects a back-lobe signal, according to an embodiment.

FIG. 6 illustrates a particular example in which a base station detects a back-lobe signal, according to an embodiment.

In an embodiment, the base station 200 may include at least one detector 630 and at least one ground conductor (GND) 640 at the back side 255 of the plurality of antennas 250. The at least one detector 630 and the at least one GND 640 may be located within a predetermined range from the plurality of antennas 250.

The at least one detector 630 according to an embodiment may be included in a multi-layer printed circuit board (PCB) located on a movement path from among a plurality of movement paths of a back-lobe signal beam-formed by the plurality of antennas 250. A structure of the at least one detector 630 may be determined based on at least one of a thickness of the multi-layer PCB, a dielectric constant of the multi-layer PCB, and a stack-up structure of the multi-layer PCB.

When a signal is beam-formed by the plurality of antennas 250, a main-lobe signal 610, a back-lobe signal 620, a side-lobe signal, and the like may be generated. The at least one detector 630 according to an embodiment may detect the back-lobe signal 620 beam-formed by the plurality of antennas 250.

In an embodiment, a strength of the back-lobe signal 620 that is beam-formed by the plurality of antennas 250 and is detected by the at least one detector 630 may be determined based on the number of the GNDs 640 located on one or more movement paths from among the plurality of movement paths on which the beam-formed back-lobe signal 620 reaches the at least one detector 630. For example, a strength of the back-lobe signal 620 that is beam-formed by the plurality of antennas 250 and is detected by the at least one detector 630 may be greater in a case where the number of the GNDs 640 located on one or more movement paths from among the plurality of movement paths on which the beam-formed back-lobe signal 620 reaches the at least one detector 630 is 1, compared to a case where the number of the GNDs 640 is 4.

In an embodiment, a strength of the back-lobe signal 620 that is beam-formed by the plurality of antennas 250 and is detected by the at least one detector 630 may be determined according to at least one a distance d between the plurality of antennas 250 and the at least one detector 630 and a width w of the at least one detector 630.

Figure 7:
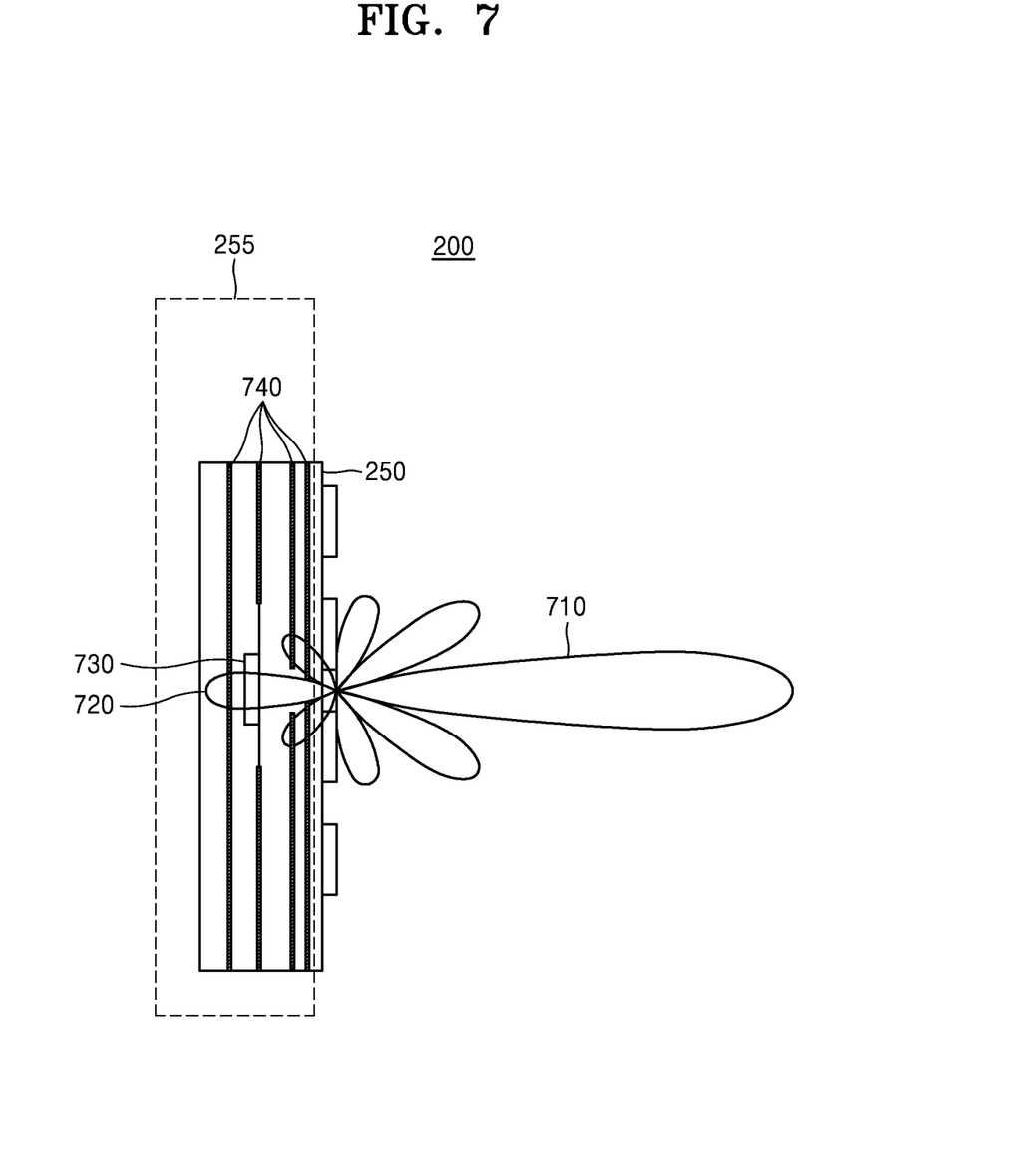
FIG. 7 illustrates a particular example in which a base station detects a back-lobe signal, according to an embodiment.

FIG. 7 illustrates a particular example in which a base station detects a back-lobe signal, according to an embodiment.

In FIG. 7, descriptions overlapping with those of FIG. 6 are omitted or briefly described.

In an embodiment, the base station 200 may include at least one detector 730 and at least one GND 740 at the back side 255 of the plurality of antennas 250. When a signal is beam-formed by the plurality of antennas 250, a main-lobe signal 710, a back-lobe signal 720, a side-lobe signal, and the like may be generated. The at least one detector 730 according to an embodiment may detect the back-lobe signal 720 beam-formed by the plurality of antennas 250.

Compared to FIG. 6, at the back side 255 of the plurality of antennas 250 of FIG. 7, the GND 740 is additionally present on a movement path from among a plurality of movement paths of the back-lobe signal 720 beam-formed by the plurality of antennas 250. Accordingly, when other conditions are equal, a strength of a back-lobe signal detected by the detector 730 may be relatively smaller than a strength of a back-lobe signal detected by the detector 630 of FIG. 6.

Figure 8:
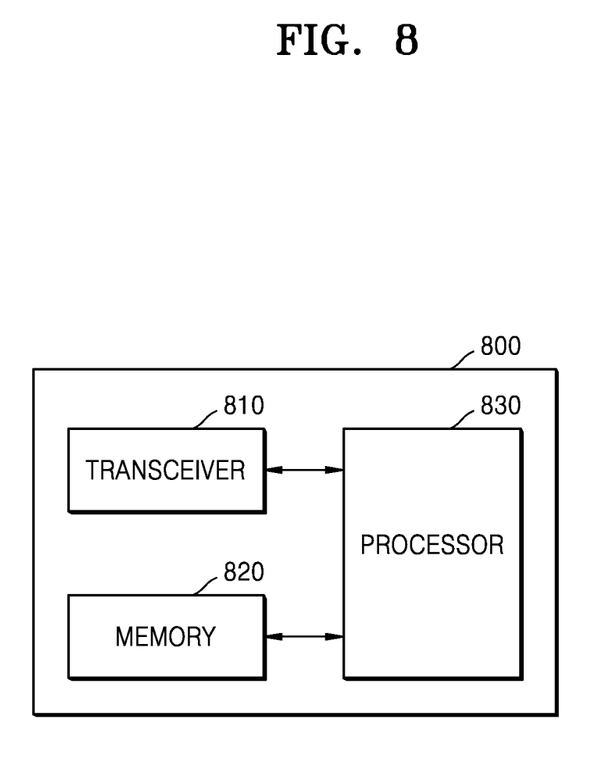
FIGS. 8 and 9 are block diagrams illustrating a configuration of a base station, according to an embodiment.
Figure 9:
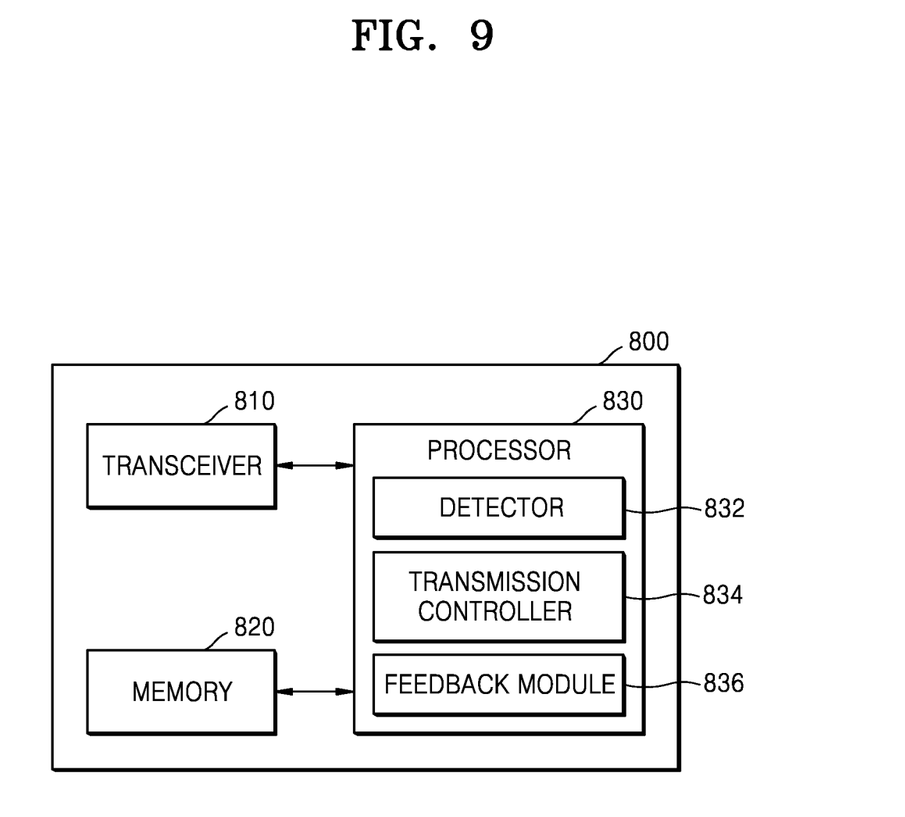

FIGS. 8 and 9 are block diagrams illustrating a configuration of a base station, according to an embodiment.

Elements of a base station 800 illustrated in FIGS. 8 and 9 may perform operations of the base station 200 in FIGS. 2 to 7, and descriptions overlapping with those of FIGS. 2 to 7 are omitted.

As illustrated in FIG. 8, the base station 800 according to an embodiment may include a transceiver 810, a memory 820, and a processor 830. However, not all elements illustrated in FIG. 8 are necessary elements of the base station 800. The base station 800 may be embodied with more elements or fewer elements than the elements illustrated in FIG. 8. In addition, the transceiver 810, the memory 820, and the processor 830 may be implemented as one chip in the base station 800 according to an embodiment.

The transceiver 810 according to an embodiment may transmit or receive a signal with a UE. In this regard, the signal may include control information or data. The transceiver 810 according to an embodiment may include a RF unit, and the RF unit may include a RF transmitter and a RF receiver.

The transceiver 810 according to an embodiment may include an array structure of a plurality of antennas.

The processor 830 according to an embodiment may control all operations of the base station 800. For example, the processor 830 may perform functions or operations of the base station 800 described with reference to FIGS. 2 to 7. Also, the processor 830 may generally control elements such as the transceiver 810, the memory 820, or the like included in the base station 800.

The processor 830 according to an embodiment may convert first IQ data included in a first digital signal into RF signals and may apply the respective RF signal to a plurality of antennas.

Also, the processor 830 may detect a back-lobe signal beam-formed by the plurality of antennas.

Also, the processor 830 may perform linearization on second IQ data included in a second digital signal, based on the detected back-lobe signal.

The memory 820 according to an embodiment may store at least one program for processing and controlling the processor 830, and may also store an input signal to the base station 800 or output from the base station 800.

As illustrated in FIG. 9, the processor 830 included in the base station 800 according to an embodiment may include a detector 832, a transmission controller 834, and a feedback module 836. However, not all elements illustrated in the processor 830 of FIG. 9 are necessary elements of the processor 830. The processor 830 may be embodied with more elements or fewer elements than the elements included in the processor 830 of FIG. 9.

The transmission controller 834 according to an embodiment may convert the first IQ data included in the first digital signal into the RF signals and may apply the RF signals to the plurality of antennas, respectively.

The detector 832 according to an embodiment may detect the back-lobe signal beam-formed by the plurality of antennas. A strength of the back-lobe signal detected by the detector 832 may be determined based on the number of GNDs located on a movement path from among a plurality of movement paths of the back-lobe signal beam-formed by the plurality of antennas. However, an embodiment is not limited thereto, and the strength of the back-lobe signal detected by the detector 832 may vary according to the number of GNDs that are not located on a movement path from among the plurality of movement paths of the back-lobe signal beam-formed by the plurality of antennas.

The feedback module 836 according to an embodiment may transfer the back-lobe signal detected by the detector 832 to the transmission controller 834.

The transmission controller 834 according to an embodiment may perform linearization on second IQ data included in a second digital signal, based on the detected back-lobe signal. For example, the transmission controller 834 may perform linearization on the second IQ data by applying a DPD technique to the second IQ data by using the detected back-lobe signal.

It is obvious to one of ordinary skill in the art that the descriptions of the disclosure are for exemplary embodiments and may be easily embodied in many different forms without changing the technical concept or essential features of the disclosure. Thus, it should be understood that the embodiments described herein should be considered in a descriptive sense only and not for purposes of limitation. For example, configuring elements that are singular forms may be executed in a distributed fashion, and also, configuring elements that are distributed may be combined and then executed.

The scope of the disclosure is defined by the appended claims, and all differences and modifications that can be derived from the meanings and scope of the claims and other equivalent embodiments therefrom will be construed as being included in the disclosure.

The invention claimed is:

1. A base station communicating by using a plurality of antennas, the base station comprising:
   a memory;
   a transceiver comprising the plurality of antennas forming an array structure; and
   at least one processor configured to:
      convert first in-phase quadrature (IQ) data comprised in a first digital signal into radio frequency (RF) signals and then apply the RF signals to the plurality of antennas, respectively,
      detect a back-lobe signal beam-formed by the plurality of antennas, and
      perform linearization on second IQ data comprised in a second digital signal, based on the detected back-lobe signal.

2. The base station of claim 1, wherein the at least one processor is further configured to shift phases of the RF signals before applying the RF signals to the plurality of antennas, respectively.

3. The base station of claim 1, wherein the at least one processor is configured to detect the back-lobe signal beam-formed by the plurality of antennas, by using at least one detector.

4. The base station of claim 3, wherein the at least one detector is located on a movement path from among a plurality of movement paths of the back-lobe signal beam-formed by the plurality of antennas.

5. The base station of claim 3, wherein the at least one detector is comprised in a multi-layer printed circuit board (PCB) located on a movement path from among a plurality of movement paths of the back-lobe signal beam-formed by the plurality of antennas.

6. The base station of claim 3, wherein the base station further comprises at least one ground conductor (GND) located within a predetermined range from the plurality of antennas.

7. The base station of claim 1, wherein the at least one processor is further configured to perform linearization on the second IQ data by applying a Digital Pre-Distortion (DPD) technique to the second IQ data by using the detected back-lobe signal.

8. The base station of claim 1, wherein the at least one processor is further configured to obtain power corresponding to the detected back-lobe signal, and adjust power of the second digital signal, based on the obtained power.

9. The base station of claim 1, wherein the at least one processor further comprises:
   a transmission controller configured to convert the first IQ data into the RF signals and then apply the RF signals to the plurality of antennas, respectively, and perform linearization on the second IQ data; and
   a feedback module configured to transfer the detected back-lobe signal to the transmission controller.

10. A method, performed by a base station, of communicating by using a plurality of antennas, the method comprising:
    converting first in-phase quadrature (IQ) data comprised in a first digital signal into radio frequency (RF) signals and then applying the respective RF signals to the plurality of antennas forming an array structure;
    detecting a back-lobe signal beam-formed by the plurality of antennas; and
    performing linearization on second IQ data comprised in a second digital signal, based on the detected back-lobe signal.

11. The method of claim 10, wherein applying the respective RF signals to the plurality of antennas further comprises shifting phases of the RF signals respectively before applying the RF signals to the plurality of antennas, and
    wherein the method further comprises performing beam-forming, based on a phase difference between the RF signals.

12. The method of claim 10, wherein detecting the back-lobe signal further comprises detecting the back-lobe signal using at least one detector located on a movement path from among a plurality of movement paths of the back-lobe signal beam-formed by the plurality of antennas.

13. The method of claim 10, wherein the performing of the linearization comprises performing linearization on the second IQ data by applying a Digital Pre-Distortion (DPD) technique to the second IQ data by using the detected back-lobe signal.

14. The method of claim 10, further comprising:
    obtaining power corresponding to the detected back-lobe signal; and
    adjusting power of the second digital signal, based on the obtained power.

15. A non-transitory computer-readable recording medium including instructions that, when executed by at least one processor, are configured to cause the at least one processor to:
    convert first in-phase quadrature (IQ) data comprised in a first digital signal into radio frequency (RF) signals and then applying the respective RF signals to a plurality of antennas forming an array structure;
    detect a back-lobe signal beam-formed by the plurality of antennas; and
    perform linearization on second IQ data comprised in a second digital signal, based on the detected back-lobe signal.

* * * * *